US006438467B1

(12) United States Patent
Pacsai

(10) Patent No.: US 6,438,467 B1
(45) Date of Patent: Aug. 20, 2002

(54) REMOTE CONTROL CONVENIENCE AND INFORMATION CONVEYANCE SYSTEM ASSOCIATED WITH A VEHICLE

(75) Inventor: Ernest Edmond Pacsai, Wixom, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/753,046

(22) Filed: Jan. 2, 2001

(51) Int. Cl.$^7$ ................................................ G06F 7/00
(52) U.S. Cl. ........................... 701/2; 73/146.2; 340/442
(58) Field of Search ................... 701/2, 69; 73/146.2, 73/146.4, 146.5; 340/442, 444, 445; 455/3.03, 423, 62, 67.1, 88, 575

(56) References Cited

U.S. PATENT DOCUMENTS

| | | | |
|---|---|---|---|
| 4,723,445 A | | 2/1988 | Ripley et al. |
| 4,890,090 A | | 12/1989 | Ballyns |
| 4,918,423 A | | 4/1990 | Fukuyama et al. |
| 4,947,151 A | | 8/1990 | Rosenberger |
| 4,978,941 A | * | 12/1990 | Brown ........................ 340/447 |
| 4,998,092 A | | 3/1991 | Ohno et al. |
| 5,301,553 A | | 4/1994 | Schultz et al. ................ 73/705 |
| 5,463,374 A | | 10/1995 | Mendez et al. |
| 5,473,938 A | * | 12/1995 | Handfield et al. ......... 73/146.5 |
| 5,483,826 A | | 1/1996 | Schultz et al. |
| 5,483,827 A | | 1/1996 | Kulka et al. |
| 5,500,637 A | | 3/1996 | Kokubu |
| 5,602,524 A | | 2/1997 | Mock et al. |
| 5,663,496 A | * | 9/1997 | Handfield et al. ......... 73/146.5 |
| 5,717,376 A | | 2/1998 | Wilson |
| 5,741,966 A | * | 4/1998 | Handfield et al. ......... 73/146.5 |
| 5,838,229 A | | 11/1998 | Robinson, III |
| 6,154,658 A | * | 11/2000 | Caci ............................ 455/466 |
| 6,169,480 B1 | * | 1/2001 | Uhl ............................. 340/442 |

OTHER PUBLICATIONS

U.S. Lin Patent Application Serial No. 09/400,227, filed Sep. 21, 1999 entitled System for Conveying Vehicle Status Information Upon Exit from a Vehicle.

* cited by examiner

*Primary Examiner*—Gertrude Arthur
(74) *Attorney, Agent, or Firm*—Tarolli, Sundheim, Covell, Tummino & Szabo L.L.P.

(57) ABSTRACT

A system (10) for a vehicle (12) that has a plurality of inflatable tires (14–20), wherein the system has a plurality of sensor units (22–28) associated with the plurality of tires. Each of the sensor units (e.g., 22) senses inflation pressure of the associated tire (e.g., 14) and transmits a signal (e.g., 30) indicative of the sensed tire inflation pressure. A portable unit (44) of the system (10) is located remote from the vehicle (12) and is operable by a person (66) to transmit a signal (48) that conveys a remote control function request. The portable unit (44) also receives a signal (46) indicative of sensed tire inflation pressure and provides an indication of tire inflation pressure to the person (66). A control/communication unit (40) is located at the vehicle and receives the signal (48) conveying the remote function request and causes performance of the remotely requested function. The control/communication unit (40) also receives the signals (e.g., 30) transmitted from the sensor units (e.g., 22) and transmits the signal (46) indicative of sensed tire inflation pressure to the portable unit (44).

6 Claims, 2 Drawing Sheets

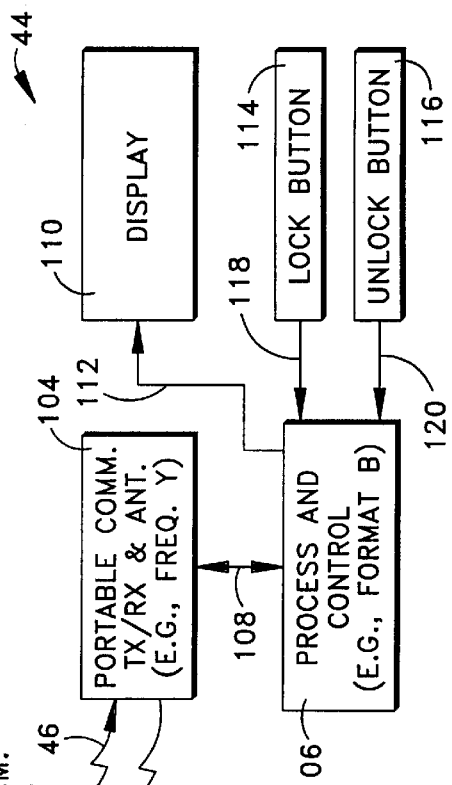
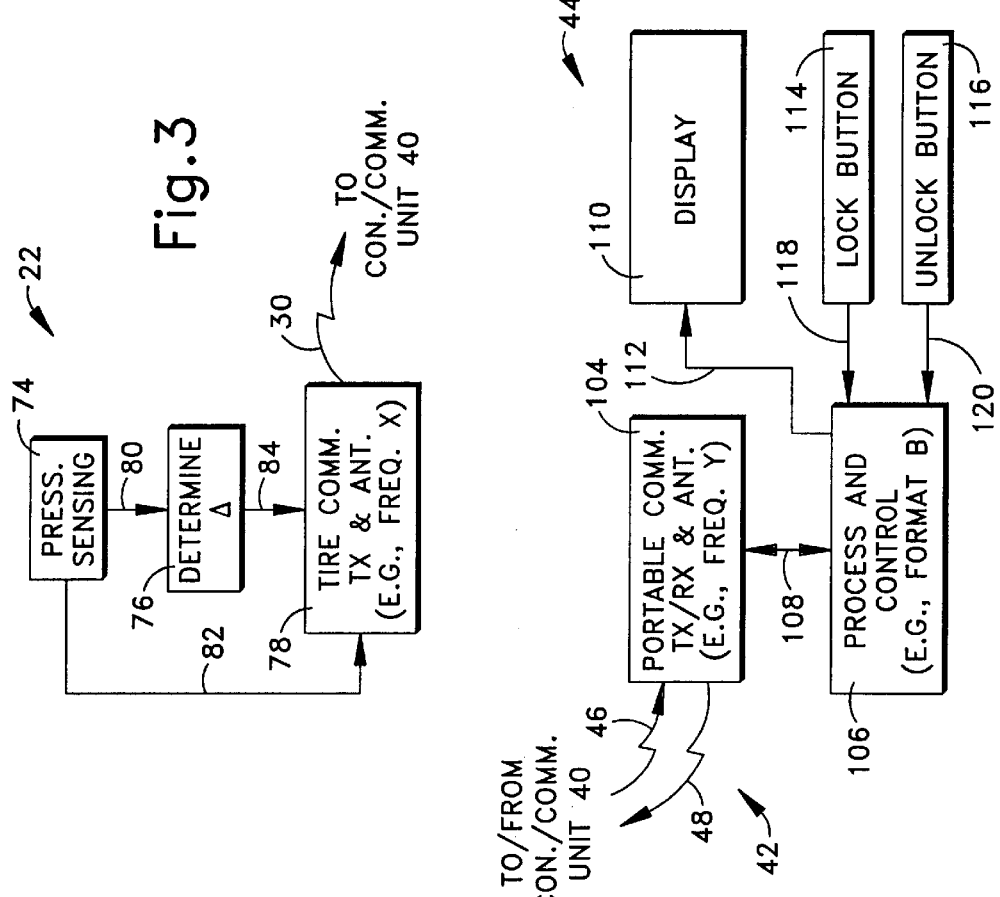
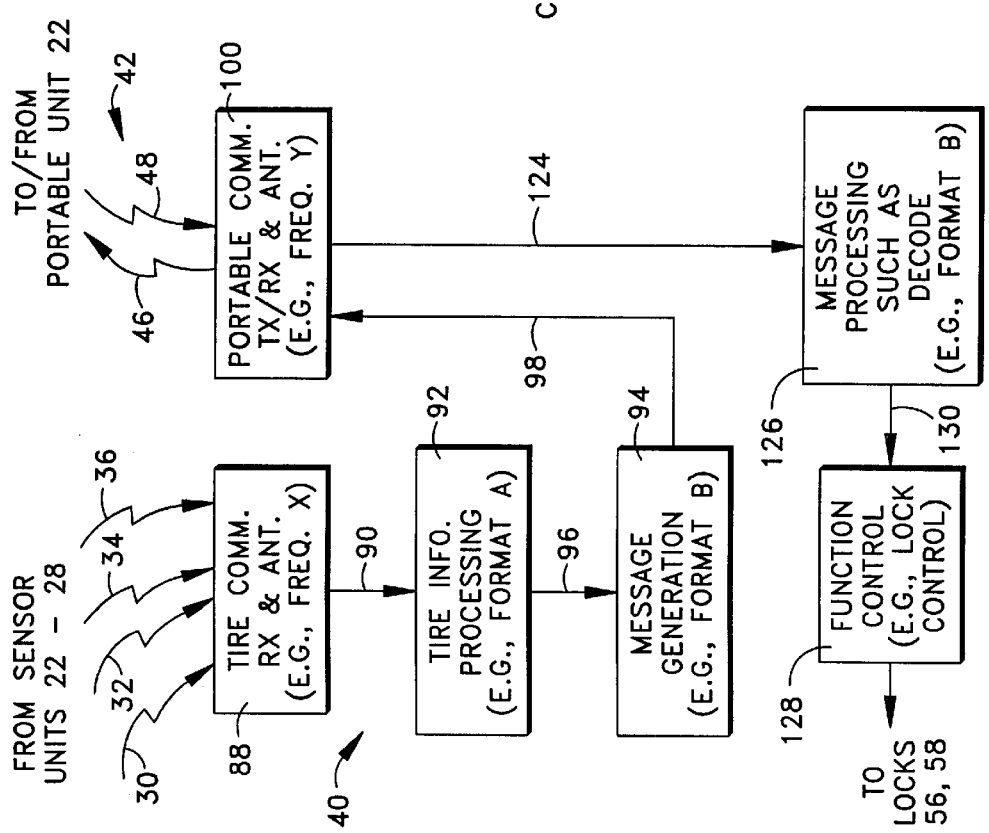

REMOTE CONTROL CONVENIENCE AND INFORMATION CONVEYANCE SYSTEM ASSOCIATED WITH A VEHICLE

FIELD OF THE INVENTION

The present invention relates to systems for remote control of a vehicle system by a person, such as a vehicle owner, and relates to systems for conveying vehicle status information to the person.

BACKGROUND OF THE INVENTION

Remote convenience systems for vehicles are known in the art. Such remote convenience systems remotely control one or more vehicle functions. An example of such a remotely controlled function is the locking and unlocking of one or more vehicle doors. A remote convenience vehicle system that permits remote locking and unlocking functions is commonly referred to as a remote keyless entry system.

Known remote convenience vehicle systems include a receiver unit mounted in an associated vehicle and a portable, hand-held transmitter unit located remote from the receiver unit. The portable unit is provided with one or more manually actuatable pushbutton switches. Each pushbutton switch is associated with a remote control vehicle function to be performed. Typically, a vehicle owner carries such a portable unit on their person when the owner is outside/away of the vehicle.

Electronic tire pressure monitoring systems for vehicles are known in the art. Typically, such a system provides an indication of tire inflation pressure to a vehicle operator while the operator is located with an interior of an associated vehicle. The indication is typically provided in the form of an informative message provided on a display device that is located with an instrument panel of the associated vehicle.

SUMMARY OF THE INVENTION

In accordance with one aspect, the present invention provides a system for a vehicle that has a plurality of inflatable tires. A plurality of sensor means of the system is associated with the plurality of tires. Each sensor means senses inflation pressure of the associated tire and transmits a signal indicative of the sensed tire inflation pressure. The system includes portable transceiver means that is located remote from the vehicle. The portable transceiver means is operable by a person for transmitting a signal conveying a remote control function request. The portable transceiver means also receives a signal indicative of sensed tire inflation pressure and provides an indication of tire inflation pressure to the person. Control and communication means of the system is located at the vehicle. The control and communication means receives the signal conveying the remote function request and causes performance of the remotely requested function. The control and communication means also receives the signals transmitted from the sensor means and transmits the signal indicative of sensed tire inflation pressure to the portable transceiver means.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is a block diagram of a tire inflation pressure sensing unit of the system of FIG. 1 that is located at one of the tires of the shown vehicle;

FIG. 4 is a block diagram of a control/communication unit of the system of FIG. 1 that is located at the shown vehicle; and FIG. 5 is a block diagram of a portable unit of the system of FIG. 1 that is located remote from the shown vehicle.

DESCRIPTION OF PREFERRED EMBODIMENT

Figure 1:
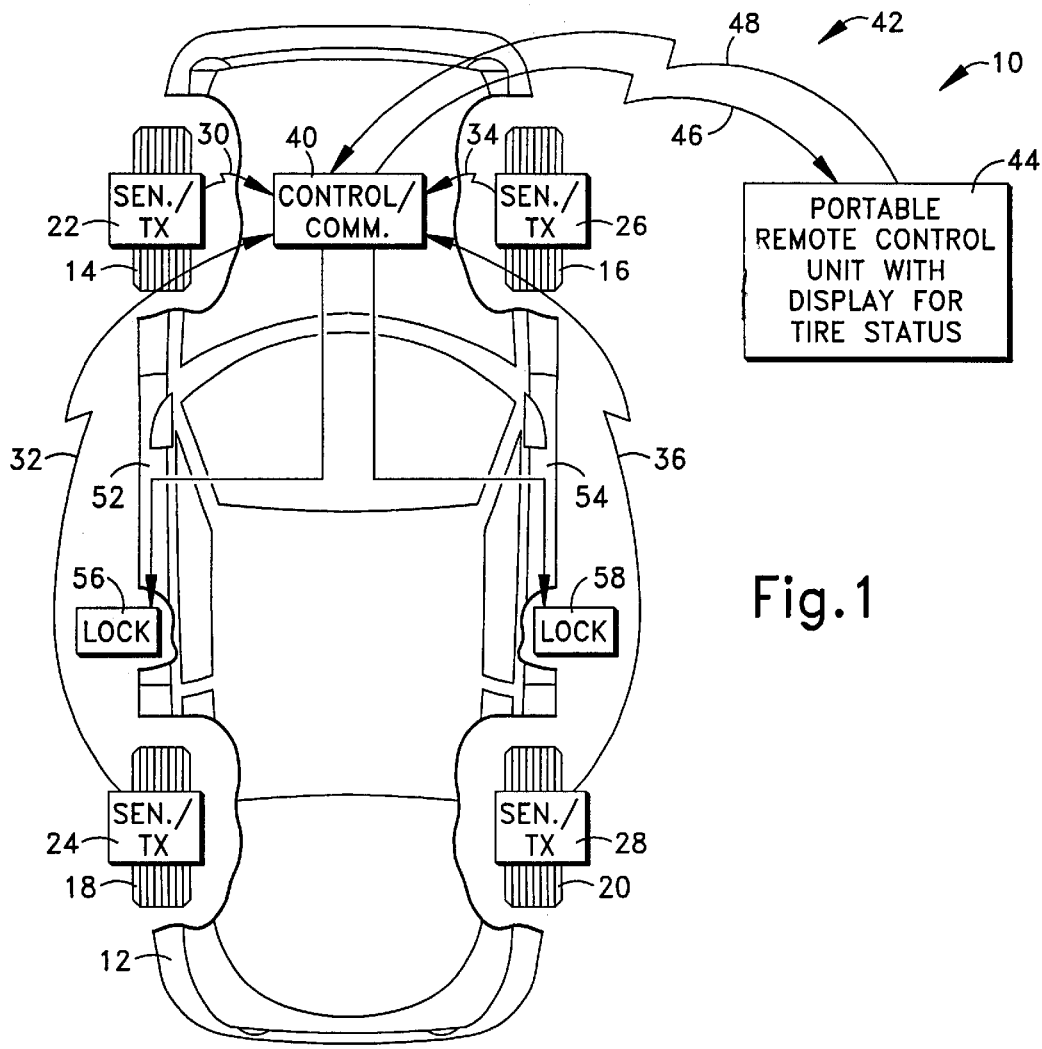
FIG. 1 is a schematic illustration of a system in accordance with the present invention, and an associated vehicle.

One embodiment of a system 10, in accordance with the present invention, is schematically shown in FIG. 1 along with an associated vehicle 12. The vehicle 12 includes a plurality of (e.g., four) inflatable tires 14–20. Within or associated with the plurality of tires 14–20 is a plurality of sensor units 22–28. Each sensor unit (e.g., 22) senses inflation pressure of the associated tire (e.g., 14) and transmits a signal (e.g., 30) indicative of the sensed inflation pressure. Preferably, the signal (e.g., 30) transmitted from each sensor unit (e.g., 22) is identifiable as originating from that unit (e.g., a certain identification code conveyed in a first communication format designated "A") and is a radio frequency signal (e.g., a first radio frequency designated "X").

A control/communication unit 40 of the system 10 is mounted within the vehicle 12. The control/communication unit 40 receives the signals 30–36 transmitted from the sensor units 22–28. Accordingly, the control/communication unit 40 receives information regarding tire inflation pressure.

The control/communication unit 40 also communicates 42 with a portable remote control unit 44 of the system 10. The communication 42 has a certain format (e.g., coded, encrypted, and the like). It is to be noted that the format for the communication 42 between the control/communication unit 40 and the portable unit 44 may be designated as a second format and may be different than the format "A" (i.e., format "B") used for the communication (i.e., signals 30–36) from the sensor units 22–28 to the control/communication unit 40.

Preferably, the communication 42 between the control/communication unit 40 and the portable unit 44 is via radio frequency communication (e.g., at a second radio frequency designated "Y"). It is to be noted that the signal frequency of the communication (i.e., signals 30–36) from the sensor units 22–28 to the control/communication unit 40 may be different than the frequency of the communication 42 between the control/communication unit 40 and the portable unit 44 (e.g., the first frequency "X" and the second frequency "Y" are different).

Turning to the communication 42 between the control/communication unit 40 and the portable unit 44, it is to be appreciated that the communication is bi-directional. The communication from the control/communication unit 40 at the vehicle 12 to the portable unit 44 includes a signal 46 that conveys tire inflation pressure information to the portable unit. Upon receipt of tire inflation pressure information at the portable unit 44, the information is displayed for observation by a person in possession of the portable unit (e.g., the vehicle owner).

The communication from the portable unit 44 to the control/communication unit 40 at the vehicle 12 includes a signal 48 that conveys a remote control function request to cause remote control performance of a vehicle function at the vehicle 12. In the illustrated example, remotely controlled functions include locking and unlocking of one or more vehicle doors 52, 54. In order to accomplish the remote control locking/unlocking of the doors 52, 54, the control/communication unit 40 at the vehicle 12 is operatively connected to vehicle door lock mechanisms 56, 58.

It is to be appreciated that other remote convenience devices at the vehicle 12 may be remotely controlled via communication from the portable unit 44. Examples of such remote convenience devices include a trunk latch, an alarm system, a power seat, a power window, a seat heater, and an engine starter.

Turning to the portable unit 44, a person (e.g., the vehicle owner) remotely controls convenience functions at the vehicle 12 and also receives information regarding tire inflation pressure status, all via the single portable unit. Such information regarding tire inflation pressure status is often most desirable when the person is not operating the vehicle 12, and is thus not within the vehicle but is outside of the vehicle.. Typically, when the vehicle 12 is stopped and the tires 14–20 of the vehicle are being serviced, the vehicle operator (i.e., the person in possession of the portable unit 44) is often at a location adjacent to a vehicle tire (e.g., 18).

Figure 2:
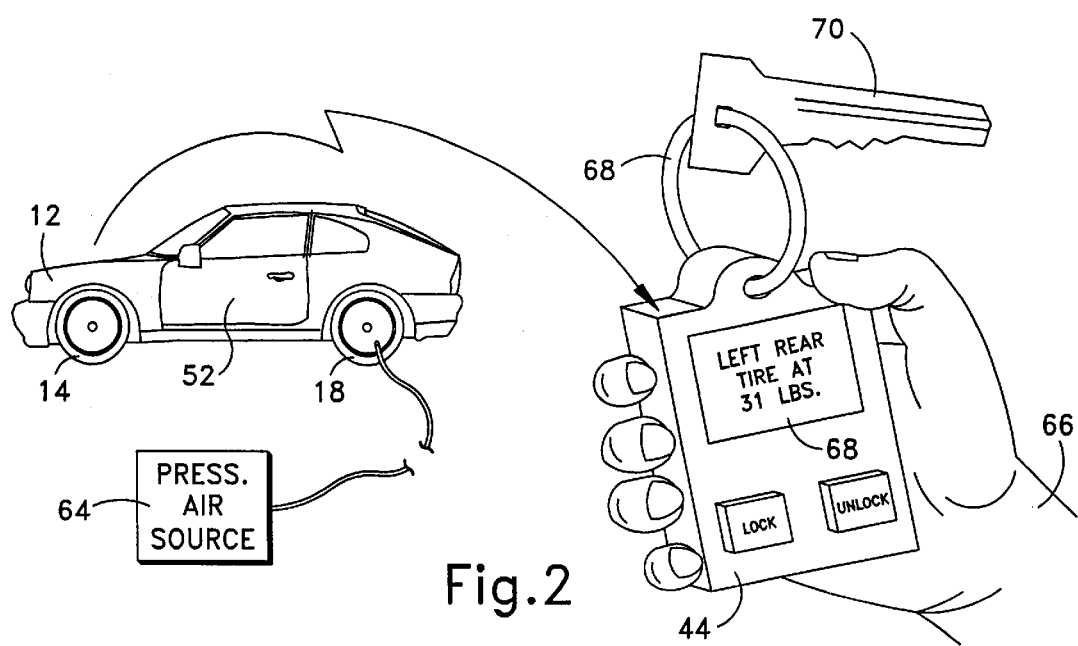
FIG. 2 is a pictorial illustration of operation of the system of FIG. 1 to indicate tire pressure to a person.

An example of such a scenario is shown in FIG. 2 and typically occurs when the vehicle 12 is stopped at a service station (not shown) and pressurized air from a pressurized air source 64 at the service station is being provided to one of the inflatable tires (e.g., 18) by the vehicle owner 66 (only the hand of the owner is shown). With the portable unit 44 in the possession of the vehicle owner 66, the inflation pressure within the tire (e.g., 18) that is being serviced is monitored during the servicing (e.g., inflating) of the tire.

As shown in the example of FIG. 2, the portable unit 44 is in the form of a fob that is attached via a ring 68 to a least one key 70 (e.g., a vehicle ignition key). Thus, the portable unit 44 is easily held in the hand of the vehicle owner 66 while inflation air is supplied to the tire (e.g., 18).

Turning to the specifics of the sensor unit (e.g., 22, FIG. 3) at each tire, each of the units preferably have identical structure. Thus, only the first sensor unit 22 is shown in detail with the understanding the other sensor units 24–28 have the same structure. The sensor unit 22 includes a pressure sensing portion 74, a determination portion 76, and a transmitter portion 78. The sensing portion 74 is operatively connected 80 to the determination portion 76 and is operatively connected 82 the transmitter portion 78. The determination portion 76 is also operatively connected 84 to the transmitter portion 78. The transmitter portion 78 includes transmit circuitry and an antenna for transmitting the signal 30.

In the disclosed example, the sensing portion 74 senses pressure in a periodic, continuous fashion. The sensed pressure information is provided to the determination portion 76, which in turn determines whether a change in sensed tire inflation pressure exceeds a predetermined threshold. In one example, the determination as to whether the predetermined threshold is exceeded is based upon a determination of whether a predetermined amount of pressure increase occurs within a predetermined time period. Exceeding the threshold is associated with a desire to output the signal 30 indicative of the inflation pressure of the associated tire. Accordingly, when the determination portion 76 determines that the change satisfies the predetermined threshold criteria, the transmitter portion 78 is enabled for a predetermined period of time to transmit the signal 30 indicative of current inflation pressure of the tire. The current inflation pressure information is conveyed via the signal 30 provided in the first format (e.g., format "A") and at the first frequency (e.g., format "x").

It is to be understood that sensing of the tire inflation pressure and provision of the sensed tire inflation pressure information to the control/communication unit 40 (FIG. 1) via the signal 30 may occur in response to some other stimulus (e.g., on a predetermined time table or via any suitable timing or activity schedule).

Turning to the control/communication unit 40 (FIG. 4), a receiver portion 88 includes receive circuitry and an antenna for receiving the signals 30–36. The receiver portion 88 is operatively connected 90 to a tire pressure information processing portion 92. In turn, a message generation portion 94 is operatively connected 96 to the processing portion 92 and is operatively connected 98 to a transceiver portion 100. The transceiver portion 100 includes transceive circuitry and an antenna for outputting the signal 46 for reception by the portable unit 44.

In response to receipt of one or more signals (e.g., 30) from the sensor unit(s) (e.g., 22) at the tire(s) (e.g., 14), the receiver portion 88 conveys the contents of the signal(s) to the processing portion 92. The processing portion 92 is configured to operate in the same format (e.g., format "A") at the sensor units 22–28, such that the information from the signal(s) is discerned and held for provision to the person (e.g., the vehicle owner) holding the portable unit 44.

To provide the information to the person, the message generation portion 94 generates a signal that conveys an appropriate message to the transceiver portion 100. The message generation portion 94 operates in the second format (e.g., format "B"). In response to the stimulus of the signal from the message generation portion 94, the transceiver portion 100 outputs the signal 46 to the portable unit 44.

Turning to the portable unit 44 (FIG. 5), a transceiver portion 104 is provided. The transceiver portion 104 includes transcieve circuitry and an antenna to receive and transmit the communication 42 between the control/communication unit 40 at the vehicle 12 and the portable unit 44. A process and control portion 106 is operatively connected 108 to the transceiver portion 104. In turn, a display 110 is operatively connected 112 to the process and control portion 106.

In response to receipt of the signal 46 conveying sensed tire inflation pressure information from the control/communication unit 40 at the portable unit 44, the process and control portion 106 operates in the second format (e.g., format "B") to appropriately process (e.g., decodes, etc.) the conveyed tire pressure information. A signal is provided to the display 110 such that the display provides indicia for observation by the person (e.g., the vehicle owner) holding the portable unit 44. In the example shown in FIG. 2, the indicia indicates that the left rear tire is at a current inflation pressure of 31 lbs.

Turning to the aspect of remote convenience control, the portable unit 44 (FIG. 5) includes two manually actuatable pushbutton switches 114 and 116. One switch 114 is associated with a lock function of the vehicle doors 52, 54 and the other switch 116 is associated with an unlock function of the vehicle doors. The pushbutton switches 114 and 116 are operatively connected 118 and 120, respectively, to the process and control portion 106.

In response to a stimulus signal provided to the process and control portion 106 due to manual actuation of a pushbutton switch (e.g., 116), the process and control portion 106 provides an associated message package (e.g., unlock vehicle doors) to the transceiver portion 104. In response to the stimulus of the signal provided from the process and control portion 106, the signal 48 is output from the portable unit 44 for reception by the control/communication unit 40 at the vehicle 12.

Turning again to the control/communication unit 40 (FIG. 4) at the vehicle 12, the transceiver portion 100 is operatively connected 124 to a message processing portion 126 of the control/communication unit. In turn, a function control portion 128 is operatively connected 130 to the message processing portion 126. In the illustrated example, the function control portion 128 is a lock controller.

Upon receipt of the signal 48 from the portable unit 44 that conveys a remote convenience function request, a signal that conveys the remote control function request is conveyed to the message processing portion 126. The message is processed (e.g., decoded, etc.) and an appropriate signal is provided to the function control portion 128. The processing is in the format "B" signal format, and is different than the format (e.g., format "A") used in the processing portion 92. In response to receipt of the signal from the message processing portion 126, an appropriate signal is output to the lock mechanisms 56, 58 to carry out the remotely requested function (e.g., unlock the vehicle doors 52, 54).

It is to be appreciated that because the signal frequencies and formats are different for the communication (i.e., signals 30–36) from the inflation sensor units 22–28 and the communication 42 to/from the portable unit 44, the two signal types are different. As a result of the different signal types, the sensor units 22–28 and the portable unit 44 need not be compatible with regard to communication.

From the above description of the invention, those skilled in the art will perceive improvements, changes and modifications. Such improvements, changes and modifications within the skill of the art are intended to be covered by the appended claims.

Having described the invention, the following is claimed:

1. A system for a vehicle having an inflatable tire, said system comprising:

sensor means for sensing inflation pressure of the tire and for transmitting a first signal indicative thereof;

a convenience mechanism mounted on the vehicle and operable to perform a convenience function;

portable transceiver means located remote from the vehicle and the tire, said portable transceiver means being operable for transmitting a signal conveying a remote control function request and for receiving a second signal indicative of sensed tire inflation pressure, said portable transceiver means, in response to receiving the second signal, providing an indication of tire inflation pressure; and control and communication means, mounted on the vehicle, for receiving the signal conveying the remote control function request and, in response to receiving the signal conveying the remote control function request, for operating said convenience mechanism to perform the convenience function, said control and communication means also receiving the first signal transmitted from said sensor means and transmitting the second signal to said portable transceiver means.

2. The system as set forth in claim 1 wherein said sensor means includes means for transmitting the first signal indicative of the sensed tire inflation pressure in response to a change in sensed tire inflation pressure exceeding a predetermined threshold.

3. The system as set forth in claim 2 wherein said sensor means includes means for transmitting the first signal in response to a sensed increase in tire inflation pressure.

4. The system as set forth in claim 1 wherein the first signal and the second signal have similar electrical characteristics.

5. The system as set forth in claim 1 wherein the first signal and the second signal have different electrical characteristics.

6. The system as set forth in claim 1 wherein said convenience mechanism is a locking mechanism associated with a vehicle door, and wherein said control and communication means, in response to receiving the signal conveying the remote control function request, operates said locking mechanism.

* * * * *